(12) United States Patent
Yonaiyama et al.

(10) Patent No.: US 8,821,626 B2
(45) Date of Patent: Sep. 2, 2014

(54) ADHESIVE FOR INORGANIC FIBER

(75) Inventors: Ken Yonaiyama, Tokyo (JP); Tetsuya Mihara, Tokyo (JP); Tetsuya Ishihara, Tokyo (JP); Tomohiko Kishiki, Tokyo (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 13/317,378

(22) Filed: Oct. 17, 2011

(65) Prior Publication Data

US 2012/0235085 A1   Sep. 20, 2012

Related U.S. Application Data

(63) Continuation-in-part of application No. 13/064,422, filed on Mar. 23, 2011, now abandoned.

(30) Foreign Application Priority Data

Mar. 18, 2011  (JP) ................................ 2011-060931
Mar. 25, 2011  (JP) ................................ 2011-067079

(51) Int. Cl.
| | | |
|---|---|---|
| C04B 35/00 | (2006.01) | |
| C09D 1/00 | (2006.01) | |
| C04B 41/50 | (2006.01) | |
| C09K 17/40 | (2006.01) | |
| C08K 7/04 | (2006.01) | |
| C09J 101/28 | (2006.01) | |

(52) U.S. Cl.
CPC ............... *C08K 7/04* (2013.01); *C09J 101/286* (2013.01)
USPC ................ 106/286.8; 106/287.1; 106/287.17; 501/154

(58) Field of Classification Search
USPC ......... 428/97, 355 R, 356; 174/259; 501/153, 501/154; 106/286.8, 287.1, 287.17
See application file for complete search history.

(56) References Cited

U.S. PATENT DOCUMENTS

| | | | | |
|---|---|---|---|---|
| 4,090,881 | A | * | 5/1978 | Keel et al. .................... 501/95.1 |
| 5,250,591 | A | * | 10/1993 | Fujii et al. .................... 523/521 |
| 5,331,040 | A | * | 7/1994 | Lee ............... 524/522 |
| 5,506,179 | A | | 4/1996 | Morishita et al. ................ 501/9 |
| 5,753,358 | A | * | 5/1998 | Korleski .................... 428/308.4 |
| 5,844,309 | A | * | 12/1998 | Takigawa et al. ............. 257/701 |
| 5,944,888 | A | * | 8/1999 | Perich et al. .................. 106/600 |
| 2008/0138568 | A1 | * | 6/2008 | Tomita et al. ................ 428/116 |
| 2009/0041975 | A1 | * | 2/2009 | Kodama et al. ............... 428/116 |
| 2009/0202779 | A1 | * | 8/2009 | Yoshida ....................... 428/116 |

FOREIGN PATENT DOCUMENTS

| | | |
|---|---|---|
| CN | 1120059 | 4/1996 |
| CN | 1290731 | 4/2001 |

(Continued)

OTHER PUBLICATIONS

Heping, L., Adhesive Formulation Process Manual, Chapter 17 "Inorganic Adhesive," pp. 831-849, Chemical Industry Press, 2006.

*Primary Examiner* — Noah Wiese
(74) *Attorney, Agent, or Firm* — Steptoe & Johnson LLP

(57) ABSTRACT

An adhesive for inorganic fibers including $SiO_2$, CaO and $Al_2O_3$ within a range excluding the range I defined by the following points A, 8, 18, 19 and 20 in the $SiO_2$—$Al_2O_3$—CaO state diagram shown in FIG. 1, and including no zeolite. Point A: $SiO_2$ (0%), $Al_2O_3$ (100%), CaO (0%): Point 8: $SiO_2$ (20.8%), $Al_2O_3$ (79.2%), CaO (0%): Point 18: $SiO_2$ (46.3%), $Al_2O_3$ (35.8%), CaO (17.9%): Point 19: $SiO_2$ (31.5%), $Al_2O_3$ (53.6%), CaO (14.9%): Point 20: $SiO_2$ (25.2%), $Al_2O_3$ (57.5%), CaO (17.3%).

23 Claims, 1 Drawing Sheet

(56) References Cited

FOREIGN PATENT DOCUMENTS

| CN | 1854226 | 11/2006 |
|---|---|---|
| CN | 101701136 | 5/2010 |
| JP | 53-099239 | 8/1978 |
| JP | 59-010345 | 1/1984 |
| JP | 7-138081 | 5/1995 |
| JP | 10-273625 | 10/1998 |
| JP | 11-166158 | 6/1999 |

* cited by examiner

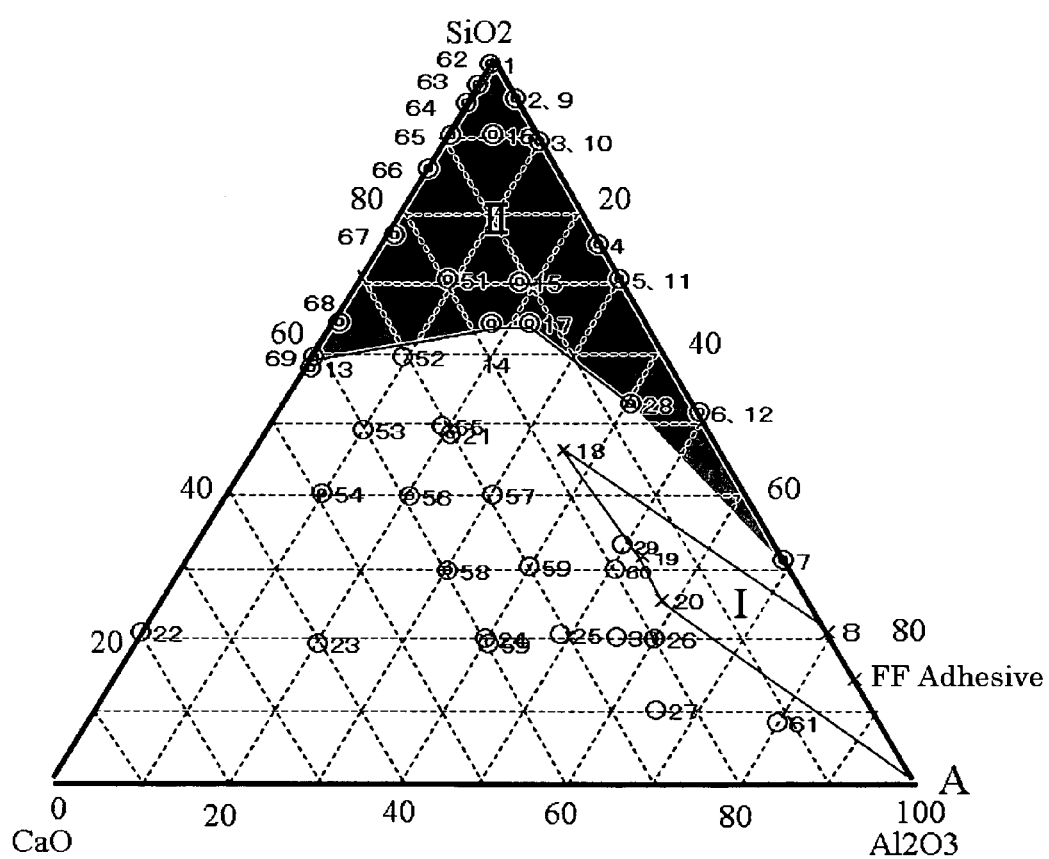

ADHESIVE FOR INORGANIC FIBER

CROSS REFERENCES TO RELATED APPLICATIONS

This application is a continuation-in-part of application Ser. No. 13/064,422, filed Mar. 23, 2011, and claims priority of prior Japanese Patent Application No. 2011-060931 filed Mar. 18, 2011, and prior Japanese Patent Application No. 2011-067079, filed Mar. 25, 2011, both of which are incorporated by reference herein in their entirety.

TECHNICAL FIELD

The invention relates to a novel adhesive for inorganic fibers, in particular, an adhesive suitable for adhering shaped articles formed of bio-soluble fibers.

BACKGROUND ART

Inorganic fibers are lightweight, easy to handle and excellent in heat resistance, and hence, they are used as a heat resisting sealing material, for example. On the other hand, in recent years, a problem has been pointed out that inorganic fibers are inhaled into a human body and the inhaled fibers invade the lung to cause disorders. Under such circumstances, bio-soluble inorganic fibers which do not cause or hardly cause disorders even if inhaled into a human body have been developed.

These bio-soluble inorganic fibers are processed into a shaped article such as a mat and a block, for example. The shaped articles are then applied to a furnace wall or the like after or while being adhered with each other by means of an adhesive. Since a shaped article formed of bio-soluble inorganic fibers is used at a temperature of 1100° C. or higher, an adhesive used for adhering these articles is required to have similar heat resistance.

Although various adhesives for inorganic materials have heretofore been developed (Patent Documents 1 to 5, for example), a few adhesives were developed for a shaped article formed of bio-soluble inorganic fibers.

RELATED ART DOCUMENTS

Patent Documents

Patent Document 1: JP-A-H11-166158
Patent Document 2: JP-A-S59-10345
Patent Document 3: JP-A-H10-273625
Patent Document 4: JP-A-H07-138081
Patent Document 5: JP-A-S53-99239

SUMMARY OF THE INVENTION

Subject to be Solved by the Invention

When a FF adhesive described in page 3, upper right column, line 16 of Patent Document 2 is used in shaped articles formed of bio-soluble inorganic fibers having a specific composition, there was a problem that if the shaped articles are heated at 1100° C. or higher, fibers at the adhesion part are melted and the articles then separate.

The invention has been made in view of the above-mentioned problem, and one object thereof is to provide an adhesive of which the heat resistance is high at the adhesion part thereof.

Means for Solving the Problem

As a result of intensive studies, the inventors have found that an inorganic compound contained in an adhesive is reacted with bio-soluble inorganic fibers, and as a result, the inorganic fibers are melted to cause the adhesion part to be peeled off. In particular, the inventors have completed the invention based on the finding that the composition of inorganic compounds contained in an adhesive exerts influence on the melting reaction.

According to the invention, the following adhesive or the like are provided.

1. An adhesive for inorganic fibers comprising $SiO_2$, $CaO$ and $Al_2O_3$ within a range excluding the range I defined by the following points A, 8, 18, 19 and 20 in the $SiO_2$—$Al_2O_3$—$CaO$ state diagram shown in FIG. 1, and comprising no zeolite.

| | | |
|---|---|---|
| Point A: $SiO_2$ (0%) | $Al_2O_3$ (100%) | $CaO$ (0%) |
| Point 8: $SiO_2$ (20.8%) | $Al_2O_3$ (79.2%) | $CaO$ (0%) |
| Point 18: $SiO_2$ (46.3%) | $Al_2O_3$ (35.8%) | $CaO$ (17.9%) |
| Point 19: $SiO_2$ (31.5%) | $Al_2O_3$ (53.6%) | $CaO$ (14.9%) |
| Point 20: $SiO_2$ (25.2%) | $Al_2O_3$ (57.5%) | $CaO$ (17.3%) |

2. The adhesive for inorganic fibers according to 1 comprising $SiO_2$, $CaO$ and $Al_2O_3$ within the range II defined by the following points 1, 7, 28, 17, 14 and 13 in the $SiO_2$—$Al_2O_3$—$CaO$ state diagram shown in FIG. 1.

| | | |
|---|---|---|
| Point 1: $SiO_2$ (100%) | $Al_2O_3$ (0%) | $CaO$ (0%) |
| Point 7: $SiO_2$ (30.7%) | $Al_2O_3$ (69.3%) | $CaO$ (0%) |
| Point 28: $SiO_2$ (51.7%) | $Al_2O_3$ (40.8%) | $CaO$ (7.5%) |
| Point 17: $SiO_2$ (64.2%) | $Al_2O_3$ (21.5%) | $CaO$ (14.3%) |
| Point 14: $SiO_2$ (64.2%) | $Al_2O_3$ (17.9%) | $CaO$ (17.9%) |
| Point 13: $SiO_2$ (58.3%) | $Al_2O_3$ (0%) | $CaO$ (41.7%) |

3. The adhesive for inorganic fibers according to 1 or 2, further comprising an organic binder in an amount of about 0.5 wt % to about 10 wt %.

4. The adhesive for inorganic fibers according to any one of 1 to 3, wherein colloidal silica is contained in an amount of 0 to about 98 wt %.

5. The adhesive for inorganic fibers according to any one of 1 to 4, wherein the adhesive comprises a solvent, and the content of solids contained in the adhesive represented by the following formula is about 5 wt % to about 85 wt %:

Content of solids=Weight of adhesive after removal of solvent(Weight after drying)×100/Weight of adhesive(Weight before drying).

6. The adhesive for inorganic fibers according to any one of 1 to 5 which is for adhering shaped articles comprising bio-soluble inorganic fibers.

7. The adhesive for inorganic fibers according to any one of 1 to 5 which is for adhering shaped articles comprising inorganic fibers having the following composition.

Total of $SiO_2$, $Al_2O_3$, $ZrO_2$, and $TiO_2$: about 50 wt % to about 82 wt %

Total of $CaO$ and $MgO$: about 18 wt % to about 50 wt %

8. The adhesive for inorganic fibers according to any one of 1 to 5 which is for adhering shaped articles comprising inorganic fibers having the following composition.

$SiO_2$: about 50 wt % to about 82 wt %

Total of $CaO$ and $MgO$: about 10 wt % to about 43 wt %

9. A kit comprising a shaped article comprising inorganic fibers and the adhesive for inorganic fibers according to any one of 1 to 8.

10. A cured adhesive obtained by drying or heating the adhesive for inorganic fibers according to any one of 1 to 8.
11. An adhered shaped article obtained by adhering shaped articles with the adhesive for inorganic fibers according to any one of 1 to 8 or the cured adhesive according to 10.

Advantageous Effects of the Invention

According to the invention, it is possible to provide an adhesive which has high heat resistance in an adhesion part.

BRIEF DESCRIPTION OF THE DRAWINGS

FIG. 1 is a $SiO_2$—$Al_2O_3$—$CaO$ state diagram showing the adhesive of the invention.

MODE FOR CARRYING OUT THE INVENTION

The adhesive of the invention comprises $SiO_2$, $CaO$ and $Al_2O_3$ of which the composition (wt %) is in a range excluding the range I defined by points A, 8, 18, 19 and 20 in the state diagram of $SiO_2$—$Al_2O_3$—$CaO$ shown in FIG. 1. In this state diagram, the total content of $SiO_2$, $CaO$ and $Al_2O_3$ is 100%.

The adhesive in this composition range is hardly dissolved due to the interaction with inorganic fibers at high temperatures. The reason therefor is considered that inorganic components contained in the adhesive do not undergo a dissolution reaction with fibers.

Preferable ranges of $SiO_2$, $CaO$ and $Al_2O_3$ in FIG. 1 are given below.
[Range II]
A range defined by points 1, 7, 28, 17, 14 and 13
[Range III]
A range defined by points 1, 13, 54, 58, 21, 28 and 7
[Range IV]
A range defined by points 1, 22, 23, 27, 61, 26, 60, 57, 21, 28 and 7

In the above-mentioned ranges, the adhesive of the invention contains $SiO_2$ preferably in an amount of 10% or more, more preferably 20% or more, further preferably 30% or more, and particularly preferably 50% or more. The amount of $SiO_2$ may be 100% or less, 98% or less or 95% or less. In the specification, percentages indicating the content are by weight percent (wt %) unless otherwise indicated.

The adhesive of the invention contains $CaO$ preferably in an amount of 80% or less, more preferably 50% or less, and further preferably 40% or less. The amount of $CaO$ may be 0% or more, 3% or more or 5% or more.

The adhesive of the invention contains $Al_2O_3$ preferably in an amount of 80% or less, more preferably 50% or less and further preferably 40% or more. The amount of $Al_2O_3$ may be 0% or more, 3% or more or 5% or more.

In the adhesive of the invention, the inorganic component may be only $SiO_2$, $CaO$ and $Al_2O_3$ or it may contain a small amount (for example, 3% or less or 2% or less relative to the total amount of $SiO_2$, $CaO$ and $Al_2O_3$) of $Na_2O$, S, Cl or the like in addition to $SiO_2$, $CaO$ and $Al_2O_3$. For example, it contains $Na_2O$ in an amount of 0.5 to 2.0% and the others in an amount of 0.1 to 1.0%. The contained $Na_2O$ is derived from colloidal silica, an inorganic compound or an organic binder.

The adhesive of the invention does not need to contain MgO, inorganic microballoon and zeolite.

It is preferred that the adhesive of the invention contain an inorganic binder. As the inorganic binder, clay mineral, colloidal silica or the like can be given. Inorganic binders may be used singly or in combination of two or more. Of these, colloidal silica is preferable since the strength of the adhesive is improved. Colloidal silica is contained in an amount of preferably 0 to 98 wt % and more preferably 0 to 65 wt % relative to 100 wt % of the adhesive.

If necessary, the adhesive of the invention further contains an organic binder or a solvent in addition to inorganic components. Examples of the organic binder include compounds such as cellulose compounds (carboxymethyl cellulose (CMC), methyl cellulose (MC)), albumin, casein, alginic acid, agar, starch, polysaccharide, vinyl compounds, vinylidene compounds, polyester compounds, polyamide compounds, polyether compounds, polyglycol compounds, polyvinyl alcohol compounds, polyalkylene oxide compounds and polyacrylic acid compounds. Of these, cellulose compounds are preferable. Organic binders may be used singly or in combination of two or more. The amount of an organic binder is preferably 0 to 10 wt %, more preferably 0.1 to 5 wt % relative to 100 wt % of the adhesive.

As the solvent, a polar organic solvent and water can be given. As the polar organic solvent, a monovalent alcohol such as ethanol and propanol, and a divalent alcohol such as ethylene glycol can be given. As the water, distilled water, purified water, ion-exchange water, industrial water, tap water, ground water or the like can be given. Water may be used singly or in combination of two or more. Although no particular restrictions are imposed on these solvents, water is preferable in respect of working environment and environmental load.

The amount of the solvent is preferably 15 to 95 wt %, more preferably 18 to 92 wt %, relative to 100 wt % of the adhesive.

In addition to the above-mentioned components, the adhesive of the invention may contain water glass, iron powder, SUS powder, pulp, an antiseptic or the like in an amount which does not impair the advantageous effects of the invention.

The content of solids contained in the adhesive, which is represented by the following formula, is normally 5 to 85 wt %, preferably 8 to 71 wt %.

Content of solids=Weight of adhesive after removal of solvent(weight after drying)×100/Weight of adhesive(weight before drying)

The adhesive of the invention can be produced by adjusting and mixing raw materials such that $SiO_2$, $CaO$ and $Al_2O_3$ have the above-mentioned composition.

The adhesive of the invention may be produced by mixing raw materials at room temperature or by mixing raw materials with heating. Raw materials or the like which have been heated in advance may be put and mixed. A plurality of stirrers may be used.

It suffices that total $SiO_2$, $CaO$ and $Al_2O_3$ contained in all raw materials such as an inorganic compound (mineral or the like) and a binder satisfy the above-mentioned composition.

As the raw material of $SiO_2$, silica, colloidal silica, wollastonite ($CaSiO_3$), mullite ($3Al_2O_3.2SiO_2$), kaolinite, mica, talc, bentonite, clay or the like can be used.

As the raw material of $CaO$, in addition to the above-mentioned materials, calcium oxide, calcium hydroxide, calcium carbonate, and alumina cement can be used.

As the raw material of $Al_2O_3$, in addition to the above-mentioned materials, alumina, alumina sol, kaolinite, talc, mica and alumina cement can be used.

It is preferred that the adhesive of the invention be produced by combining silica, colloidal silica, wollastonite, mullite, alumina, kaolinite and/or bentonite.

The average particle size of the components contained in the adhesive of the invention depends on the raw materials.

For example, the average particle size of fused silica, alumina, mullite, calcium carbonate or the like is less than 10 μm (for example, 0.1 to 8 μm), and the average particle size of wollastonite or the like exceeds 30 μm (for example, 33 to 58 μm).

The viscosity of the adhesive is affected by the concentration of solids, the particle size, the amount of an organic binder or the like, but is normally 1,000 to 50,000 cP.

By using the above-mentioned adhesive, two or more shaped articles which are formed of inorganic fibers can be adhered. A shaped article may have any form such as paper, a block, a board, a mat and a felt. Shaped articles can be adhered more firmly by drying the adhesive after the adhesion. Adhesion of shaped articles thus adhered with each other can be maintained even if used at high temperatures.

The adhesive of the invention is suited for adhering shaped articles containing inorganic fibers, in particular, bio-soluble inorganic fibers. Specifically, it is suited for adhering shaped articles containing inorganic fibers having the following composition.

Total of $SiO_2$, $Al_2O_3$, $ZrO_2$ and $TiO_2$: 50 to 82 wt %
Total of CaO and MgO: 18 to 50 wt %

Further, the adhesive of the invention is suited for adhering shaped articles containing inorganic fibers having the following composition.

$SiO_2$: 50 to 82 wt %
Total of CaO and MgO: 10 to 43 wt %

Bio-soluble inorganic fibers can be roughly classified into Mg silicate fibers containing a large amount of MgO and Ca silicate fibers containing a large amount of CaO. As the Mg silicate fibers, the following compositions can be exemplified.

$SiO_2$: 66 to 82 wt %
CaO: 1 to 9 wt %
MgO: 10 to 30 wt %
$Al_2O_3$: 3 wt % or less
Other oxides: less than 2 wt %

As the Ca silicate fibers, the following compositions can be exemplified. The following compositions are improved in bio-solubility after heating and fire resistance. If conventional adhesives are used for adhering such fibers, the fibers are dissolved and the adhesion is lost. However, with the adhesive of the invention, no such peeling occurs. That is, the adhesive of the invention is particularly suited for such fibers.

$SiO_2$: 66 to 82 wt % (for example, it can be 68 to 80 wt %, 70 to 80 wt %, 71 to 80 wt % or 71 to 76 wt %)
CaO: 10 to 34 wt % (for example, it can be 20 to 30 wt % or 21 to 26 wt %)
MgO: 3 wt % or less (for example, it can be 1 wt % or less)
$Al_2O_3$: 5 wt % or less (for example, it can be 3.5 wt % or less or 3 wt % or less, or it can be 1 wt % or more or 2 wt % or more)
Other oxides: less than 2 wt %

The above-mentioned inorganic fibers may or may not contain, as other oxides, one or more of alkali metal oxides ($K_2O$, $Na_2O$ or the like), $Fe_2O_3$, $ZrO_2$, $TiO_2$, $P_2O_4$, $B_2O_3$, $R_2O_3$ (R is selected from Sc, La, Ce, Pr, Nd, Sm, Eu, Gd, Tb, Dy, Ho, Er, Tm, Yb, Lu, Y or mixtures thereof). The amount of each of other oxides may be 0.2 wt % or less or 0.1 wt % or less.

Further, the total amount of $SiO_2$, CaO, MgO and $Al_2O_3$ may exceed 98 wt % or may exceed 99 wt %.

Furthermore, the bio-soluble inorganic fibers may also comprise other components in addition to $SiO_2$ and an alkaline earth metal oxide(s) (for example, at least one of MgO and CaO). For example, one or more selected from the group consisting of alumina ($Al_2O_3$), titania ($TiO_2$), zirconia ($ZrO_2$), ferric oxide ($Fe_2O_3$), manganese oxide (MnO), and potassium oxide ($K_2O$) may be contained.

Bio-soluble inorganic fibers are inorganic fibers having a physiological saline dissolution ratio at 40° C. of 1% or more, for example.

The physiological saline dissolution ratio can be measured by the following method, for example. Specifically, at first, 1 g of a sample obtained by pulverizing inorganic fibers to 200 meshes or less and 150 mL of a physiological saline solution are charged in a conical flask (volume: 300 mL) and the flask is installed in an incubator at 40° C. Next, the conical flask is continuously subjected to horizontal vibration of 120 rotations per minute for 50 hours. Subsequently, the concentrations of elements (mg/L) contained in a filtrate obtained by filtration are each measured by means of an ICP emission spectroscopic analyzer. Then, the physiologically saline dissolution ratio (%) is calculated based on the measured concentrations of the elements and the contents (mass %) of the elements in inorganic fibers before dissolution. Specifically, if the elements subjected to the measurement are silicon (Si), magnesium (Mg), calcium (Ca) and aluminum (Al), the physiologically saline dissolution ratio C (%) is calculated according to the following formula:

$$C(\%) = [\text{Amount of filtrate } (L) \times (a1+a2+a3+a4) \times 100] / [\text{Mass of inorganic fibers before dissolution } (mg) \times (b1+b2+b3+b4)/100].$$

In this formula, a1, a2, a3 and a4 are the measured concentrations (mg/L) of silicon, magnesium, calcium and aluminum, respectively, and b1, b2, b3 and b4 are the contents (mass %) of silicon, magnesium, calcium and aluminum contained in inorganic fibers before dissolution, respectively.

A shaped article may contain, in addition to inorganic fibers, organic binders, inorganic binders, inorganic compounds or the like. Insofar as the advantageous effects of the invention are not impaired, organic binders, inorganic binders, inorganic compounds or the like which are normally used can be used. Starch, an acrylic emulsion, pulp, a strengthening agent for paper, organic fibers, coagulants or the like can be exemplified as the organic binder, and colloidal silica, alumina sol, clay mineral, aluminum salts or the like can be exemplified as the inorganic binder.

When the adhesive of the invention is applied to shaped articles, the articles can be adhered with each other to some degree. Firmer adhesion can be attained by allowing the adhesive to be cured by drying or firing.

The adhesive of the invention can be provided in combination with a shaped article (as a kit).

EXAMPLES

Example 1

Production of Adhesive 24 wt % of fused silica, 21 wt % of colloidal silica (inorganic binder), 1.7 wt % of CMC (organic binder) (Sunrose, produced by Nippon Paper Chemicals), 53 wt % of water (solvent) and 0.3 wt % of an antiseptic (Deltop, produced by Japan EnviroChemicals, Inc.) (Mix 1) were mixed to produce an adhesive.

The composition of the inorganic components in the resulting adhesive was 98 wt % of $SiO_2$, 1.1 wt % of Na and 0.9 wt % of others. The inorganic components contained in the adhesive are components obtained by drying and firing the adhesive to remove the solvent and the organic binder. As for the resulting inorganic components, the composition thereof was measured by X-ray fluorescence analysis. The viscosity was measured by means of a B-type viscometer, and found to be about 30 to 40 Pa·S.

[Evaluation of Adhesion Part]

A blanket having a length of 7200 mm, a width of 600 mm and a thickness of 25 mm was produced from bio-soluble fibers (having an $SiO_2$ content of 73 mass %, a CaO content of 25 mass %, a MgO content of 0.3 mass % and an $Al_2O_3$ content of 2 mass %).

Two samples for an adhesion test of 150 mm (length)×50 mm (width)×25 mm (thickness) were cut from the blanket. In each of these two samples, the adhesive was evenly applied to a surface with a width of 50 mm and a thickness of 25 mm, and the surfaces to which the adhesive was applied were adhered with each other. Thereafter, the samples were dried at 105° C. for 8 hours, followed by heating at 1200° C. for 24 hours. The adhesion part was visually observed. As the destructive test for the adhesion part, a tensile test or a three point bending test was conducted.

The adhesive which could not be applied to a sample was evaluated to have poor applicability (x) and the adhesive which could be smoothly applied to a sample was evaluated to have good applicability (◉).

If samples were not adhered after drying (before heating), the adhesive was evaluated as poor (x), If samples were not broken but separated at an interface of the adhesive in the destructive test after drying, the adhesive was evaluated as good (O), and If a sample was broken in the destructive test after drying, the adhesive was evaluated as very good (◉).

If samples were not adhered after heating, the adhesive was evaluated as poor (x), If samples were not broken but separated at an interface of the adhesive in the destructive test after heating, the adhesive was evaluated as good (O), and If a sample was broken in the destructive test after heating, the adhesive was evaluated as very good (◉).

For the adhesive evaluated as very good in the destructive test, samples were broken and thus the adhesive has adhesion strength superior to that of the adhesive evaluated as good. However, it does not mean that the sample evaluated as good cannot be put on practical use.

The results of evaluation are shown in Table 1.

Examples 2 to 45 and Comparative Examples 1 to 5

Production and Evaluation of Adhesive

Adhesives with mixes shown in Tables 1 to 5 were produced and evaluated in the same manner as in Example 1. The results of evaluation are shown in Tables 1 to 5.

TABLE 1

|  |  | Com. Ex. 1 FF Adhesive | Ex. 1 Mix 1 | Ex. 2 Mix 2 | Ex. 3 Mix 3 | Ex. 4 Mix 4 | Ex. 5 Mix 5 | Ex. 6 Mix 6 | Ex. 7 Mix 7 | Com. Ex. 2 Mix 8 | Ex. 8 Mix 9 | Ex. 9 Mix 10 | Ex. 10 Mix 11 | Ex. 11 Mix 12 |
|---|---|---|---|---|---|---|---|---|---|---|---|---|---|---|
| Solvent | Water | — | 53 | 53 | 53 | 53 | 53 | 53 | 53 | 53 | 53 | 53 | 53 | 53 |
| Antiseptic |  | — | 0.3 | 0.3 | 0.3 | 0.3 | 0.3 | 0.3 | 0.3 | 0.3 | 0.3 | 0.3 | 0.3 | 0.3 |
| Organic binder | CMC | — | 1.7 | 1.7 | 1.7 | 1.7 | 1.7 | 1.7 | 1.7 | 1.7 | 1.7 | 1.7 | 1.7 | 1.7 |
| Inorganic compound | Fused silica | — | 24 | 22.5 | 21 | 17 | 15 | 9 | 3 | 0 | 21.9 | 19.7 | 11.1 | 2.6 |
|  | Alumina | — | 0 | 1.5 | 3 | 7 | 9 | 15 | 21 | 24 | — | — | — | — |
|  | Mullite | — | — | — | — | — | — | — | — | — | 2.1 | 4.3 | 12.9 | 21.4 |
| Inorganic binder | Colloidal silica | — | 21 | 21 | 21 | 21 | 21 | 21 | 21 | 21 | 21 | 21 | 21 | 21 |
| Solid concentration |  | 60 | 32 | 32 | 32 | 32 | 32 | 32 | 32 | 32 | 32 | 32 | 32 | 32 |
| Applicability |  | ◉ | ◉ | ◉ | ◉ | ◉ | ◉ | ◉ | ◉ | ◉ | ◉ | ◉ | ◉ | ◉ |
| Adhesion after drying |  | ◉ | ◉ | ◉ | ◉ | ◉ | ◉ | ◉ | ◉ | ◉ | ◉ | ◉ | ◉ | ◉ |
| Adhesion after firing |  | X | ◉ | ◉ | ◉ | ◉ | ◉ | ◉ | ◉ | X | ◉ | ◉ | ◉ | ◉ |
| Composition | SiO2 | 14.0 | 100.0 | 95.0 | 90.1 | 76.9 | 70.3 | 50.5 | 30.7 | 20.8 | 95.0 | 90.1 | 70.3 | 50.5 |
|  | CaO | 0.0 | 0.0 | 0.0 | 0.0 | 0.0 | 0.0 | 0.0 | 0.0 | 0.0 | 0.0 | 0.0 | 0.0 | 0.0 |
|  | Al2O3 | 86.0 | 0.0 | 5.0 | 9.9 | 23.1 | 29.7 | 49.5 | 69.3 | 79.2 | 5.0 | 9.9 | 29.7 | 49.5 |

TABLE 2

|  |  | Ex. 12 Mix 13 | Ex. 13 Mix 14 | Ex. 14 Mix 15 | Ex. 15 Mix 16 | Ex. 16 Mix 17 | Com. Ex. 3 Mix 18 | Com. Ex. 4 Mix 19 | Com. Ex. 5 Mix 20 | Ex. 17 Mix 21 |
|---|---|---|---|---|---|---|---|---|---|---|
| Solvent | Water | 61.5 | 61.5 | 61.5 | 61.5 | 61.5 | 61.5 | 61.5 | 60.8 | 61.5 |
| Antiseptic |  | 0.4 | 0.4 | 0.4 | 0.4 | 0.4 | 0.4 | 0.4 | 0.3 | 0.4 |
| Organic binder | CMC | 2.0 | 2.0 | 2.0 | 2.0 | 2.0 | 2.0 | 2.0 | 2.0 | 2.0 |
| Inorganic compound | Fused silica | 2.5 | 11.6 | 15.2 | 22.4 | 12.7 | 6.1 | 2.5 | 0.0 | 3.3 |
|  | Wollastonite | 25.3 | 10.9 | 7.2 | 3.6 | 8.7 | 10.9 | 9.0 | 10.7 | 18.1 |
|  | Alumina | 0.0 | 5.4 | 5.4 | 1.8 | 6.5 | 10.9 | 16.3 | 17.9 | 6.5 |
| Inorganic binder | Colloidal silica | 8.3 | 8.3 | 8.3 | 8.3 | 8.3 | 8.3 | 8.3 | 8.2 | 8.3 |
| Solid concentration |  | 32 | 32 | 32 | 32 | 32 | 32 | 32 | 33 | 32 |
| Applicability |  | ◉ | ◉ | ◉ | ◉ | ◉ | ◉ | ◉ | ◉ | ◉ |
| Adhesion after drying |  | ◉ | ◉ | ◉ | ◉ | ◉ | ◉ | ◉ | ◉ | ◉ |
| Adhesion after firing |  | ◉ | ◉ | ◉ | ◉ | ◉ | X | X | X | O |
| Composition | SiO2 | 58.3 | 64.2 | 70.2 | 88.1 | 64.2 | 46.4 | 31.5 | 25.2 | 48.7 |
|  | CaO | 41.7 | 17.9 | 11.9 | 6.0 | 14.3 | 17.9 | 14.9 | 17.3 | 29.8 |
|  | Al2O3 | 0.0 | 17.9 | 17.9 | 6.0 | 21.5 | 35.8 | 53.6 | 57.5 | 21.5 |

TABLE 3

|  |  | Ex. 18 Mix 22 | Ex. 19 Mix 23 | Ex. 20 Mix 24 | Ex. 21 Mix 25 | Ex. 22 Mix 26 | Ex. 23 Mix 27 | Ex. 24 Mix 28 | Ex. 25 Mix 29 | Ex. 26 Mix 30 |
|---|---|---|---|---|---|---|---|---|---|---|
| Solvent | Water | 53.2 | 55.2 | 59.9 | 60.6 | 62.7 | 61.8 | 65.2 | 60.0 | 66.0 |
| Antiseptic |  | 0.3 | 0.3 | 0.3 | 0.3 | 0.4 | 0.4 | 0.4 | 0.3 | 0.4 |
| Organic binder | CMC | 1.7 | 1.8 | 1.9 | 2.0 | 2.0 | 2.0 | 2.1 | 1.9 | 2.1 |
| Inorganic compound | Fused silica | 2.2 | 2.3 | 2.5 | 2.5 | 2.6 | 0.0 | 9.9 | 6.8 | 1.3 |
|  | Calcium carbonate | 35.4 | 28.3 | 18.2 | 14.9 | 9.5 | 11.7 | 3.7 | 9.1 | 10.0 |
|  | Alumina | 0.0 | 4.7 | 9.1 | 11.5 | 14.3 | 15.8 | 9.9 | 13.7 | 11.3 |
| Inorganic binder | Colloidal silica | 7.2 | 7.5 | 8.1 | 8.2 | 8.5 | 8.4 | 8.8 | 8.1 | 8.9 |
| Solid concentration |  | 41.4 | 39.3 | 34.1 | 33.4 | 31.0 | 32.0 | 28.3 | 34.0 | 27.4 |
| Applicability |  | ◎ | ◎ | ◎ | ◎ | ◎ | ◎ | ◎ | ◎ | ◎ |
| Adhesion after drying |  | ◎ | ◎ | ◎ | ◎ | ◎ | ◎ | ◎ | ◎ | ◎ |
| Adhesion after firing |  | ○ | ○ | ○ | ○ | ○ | ○ | ◎ | ○ | ○ |
| Composition | SiO2 | 20.1 | 19.7 | 21.5 | 21.0 | 21.4 | 10.4 | 51.7 | 33.9 | 19.6 |
|  | CaO | 79.9 | 59.9 | 38.8 | 30.7 | 19.3 | 23.8 | 7.5 | 16.2 | 24.3 |
|  | Al2O3 | 0.0 | 20.4 | 39.7 | 48.3 | 59.3 | 65.8 | 40.8 | 49.9 | 56.1 |

TABLE 4

|  |  | Ex. 27 Mix 51 | Ex. 28 Mix 52 | Ex. 29 Mix 53 | Ex. 30 Mix 54 | Ex. 31 Mix 55 | Ex. 32 Mix 56 | Ex. 33 Mix 57 | Ex. 34 Mix 58 | Ex. 35 Mix 59 | Ex. 36 Mix 60 | Ex. 37 Mix 61 |
|---|---|---|---|---|---|---|---|---|---|---|---|---|
| Solvent | Water | 57.3 | 57.3 | 57.3 | 58.2 | 56.6 | 56.6 | 60.5 | 54.0 | 55.0 | 59.3 | 65.2 |
| Antiseptic |  | 0.3 | 0.3 | 0.3 | 0.3 | 0.3 | 0.3 | 0.3 | 0.3 | 0.3 | 0.3 | 0.4 |
| Organic binder | CMC | 1.8 | 1.8 | 1.8 | 1.9 | 1.8 | 1.8 | 2.0 | 1.7 | 1.8 | 1.9 | 2.1 |
| Inorganic compound | Fused silica | 15.2 | 7.6 | 0.0 | 6.6 | 4.8 | 7.8 | 0.0 | 5.9 | 6.3 | 5.6 | 0.0 |
|  | Calcium carbonate | — | — | — | 22.9 | — | 20.7 | — | 22.5 | 17.7 | 11.3 | 4.9 |
|  | Wollastonite | 14.1 | 21.7 | 29.3 | — | 21.5 | — | 19.5 | — | — | — | — |
|  | Alumina | 3.5 | 3.5 | 3.5 | 2.2 | 7.2 | 5.0 | 9.5 | 8.2 | 11.5 | 13.5 | 18.6 |
| Inorganic binder | Colloidal silica | 7.7 | 7.7 | 7.7 | 7.9 | 7.7 | 7.7 | 8.2 | 7.3 | 7.4 | 8.0 | 8.8 |
| Solid concentration |  | 37 | 37 | 37 | 35.9 | 38 | 37.7 | 33 | 40.6 | 39.5 | 34.7 | 28.3 |
| Applicability |  | ◎ | ◎ | ◎ | ◎ | ◎ | ◎ | ◎ | ◎ | ◎ | ◎ | ◎ |
| Adhesion after drying |  | ◎ | ◎ | ◎ | ◎ | ◎ | ◎ | ◎ | ◎ | ◎ | ◎ | ◎ |
| Adhestion after firing |  | ◎ | ○ | ○ | ◎ | ○ | ◎ | ○ | ◎ | ○ | ○ | ○ |
| Composition | SiO2 | 70.0 | 59.2 | 48.4 | 40.2 | 49.9 | 40.1 | 38.8 | 29.8 | 29.7 | 29.7 | 11.2 |
|  | CaO | 20.1 | 30.9 | 41.7 | 49.9 | 30.0 | 40.0 | 31.0 | 40.2 | 30.2 | 20.3 | 10.2 |
|  | Al2O3 | 9.9 | 9.9 | 9.9 | 9.9 | 20.1 | 20.0 | 30.2 | 30.0 | 40.1 | 50.0 | 78.6 |

TABLE 5

|  |  | Ex. 38 Mix 62 | Ex. 39 Mix 63 | Ex. 40 Mix 64 | Ex. 41 Mix 65 | Ex. 42 Mix 66 | Ex. 43 Mix 67 | Ex. 44 Mix 68 | Ex. 45 Mix 69 |
|---|---|---|---|---|---|---|---|---|---|
| Solvent | Water | 61.8 | 61.8 | 61.8 | 61.8 | 61.8 | 61.8 | 61.8 | 61.8 |
| Antiseptic |  | 0.3 | 0.3 | 0.3 | 0.3 | 0.3 | 0.3 | 0.3 | 0.3 |
| Organic binder | CMC | 2.1 | 2.1 | 2.1 | 2.1 | 2.1 | 2.1 | 2.1 | 2.1 |
| Inorganic compound | Silica | 26.3 | 24.93 | 23.545 | 22.16 | 19.39 | 13.85 | 6.925 | 2.77 |
|  | Wollastonite | 1.4 | 2.8 | 4.155 | 5.54 | 8.31 | 13.85 | 20.775 | 24.93 |
| Inorganic binder | Colloidal silica | 8.1 | 8.1 | 8.1 | 8.1 | 8.1 | 8.1 | 8.1 | 8.1 |
| Solid concentration |  | 32.2 | 32.2 | 32.2 | 32.2 | 32.2 | 32.2 | 32.2 | 32.2 |
| Applicability |  | ◎ | ◎ | ◎ | ◎ | ◎ | ◎ | ◎ | ◎ |
| Adhesion after drying |  | ◎ | ◎ | ◎ | ◎ | ◎ | ◎ | ◎ | ◎ |
| Adhesion after firing |  | ◎ | ◎ | ◎ | ◎ | ◎ | ◎ | ◎ | ◎ |
| Composition | SiO2 | 97.7 | 95.4 | 93.1 | 90.8 | 86.2 | 77.0 | 65.5 | 58.6 |
|  | CaO | 2.3 | 4.6 | 6.9 | 9.2 | 13.8 | 23.0 | 34.5 | 41.4 |
|  | Al2O3 | 0.0 | 0.0 | 0.0 | 0.0 | 0.0 | 0.0 | 0.0 | 0.0 |

INDUSTRIAL APPLICABILITY

The adhesive of the invention can be used for adhering shaped articles formed of inorganic fibers.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The invention claimed is:

1. A kit comprising a shaped article comprising inorganic fibers and an adhesive composition for adhering inorganic fibers, the adhesive composition comprising:
  colloidal silica,
  an inorganic component, in addition to the colloidal silica, comprising at least one selected from the group consisting of $SiO_2$, $CaO$ and $Al_2O_3$, and
  no zeolite,
  the total amounts of $SiO_2$, $CaO$ and $Al_2O_3$ relative to each other in the adhesive composition being within the FIG. 1 SiO$_2$—Al$_2$O$_3$—CaO state diagram, but excluding range I defined by points A, 8, 18, 19 and 20 in the FIG. 1 SiO$_2$—Al$_2$O$_3$—CaO state diagram, wherein, by weight percent:
Point A: SiO$_2$ (O %) Al$_2$O$_3$ (100%) CaO (0%)
Point 8: SiO$_2$ (20.8%) Al$_2$O$_3$ (79.2%) CaO (0%)
Point 18: SiO$_2$ (46.3%) Al$_2$O$_3$ (35.8%) CaO (17.9%)
Point 19: SiO$_2$ (31.5%) Al$_2$O$_3$ (53.6%) CaO (14.9%)
Point 20: SiO$_2$ (25.2%) Al$_2$O$_3$ (57.5%) CaO (17.3%).

2. An adhered shaped article obtained by adhering shaped articles comprising inorganic fibers with an adhesive composition for inorganic,
the adhesive composition comprising:
colloidal silica,
an inorganic component, in addition to the colloidal silica, comprising at least one selected from the group consisting of SiO$_2$, CaO and Al$_2$O$_3$, and
no zeolite,
the total amounts of SiO$_2$, CaO and Al$_2$O$_3$ relative to each other in the adhesive composition being within the FIG. 1 SiO$_2$—Al$_2$O$_3$—CaO state diagram, but excluding range I defined by points A, 8, 18, 19 and 20 in the FIG. 1 SiO$_2$—Al$_2$O$_3$—CaO state diagram, wherein, by weight percent:
Point A: SiO$_2$ (O %) Al$_2$O$_3$ (100%) CaO (0%)
Point 8: SiO$_2$ (20.8%) Al$_2$O$_3$ (79.2%) CaO (0%)
Point 18: SiO$_2$ (46.3%) Al$_2$O$_3$ (35.8%) CaO (17.9%)
Point 19: SiO$_2$ (31.5%) Al$_2$O$_3$ (53.6%) CaO (14.9%)
Point 20: SiO$_2$ (25.2%) Al$_2$O$_3$ (57.5%) CaO (17.3%).

3. An adhered shaped article obtained by adhering shaped articles comprising inorganic fibers with an adhesive composition and drying or heating composition the adhesive for inorganic fibers,
the adhesive composition comprising:
colloidal silica,
an inorganic component, in addition to the colloidal silica, comprising at least one selected from the group consisting of SiO$_2$, CaO and Al$_2$O$_3$, and
no zeolite,
the total amounts of SiO$_2$, CaO and Al$_2$O$_3$ relative to each other in the adhesive composition being within the FIG. 1 SiO$_2$—Al$_2$O$_3$—CaO state diagram, but excluding range I defined by points A, 8, 18, 19 and 20 in the FIG. 1 SiO$_2$—Al$_2$O$_3$—CaO state diagram, wherein, by weight percent:
Point A: SiO$_2$ (O %) Al$_2$O$_3$ (100%) CaO (0%)
Point 8: SiO$_2$ (20.8%) Al$_2$O$_3$ (79.2%) CaO (0%)
Point 18: SiO$_2$ (46.3%) Al$_2$O$_3$ (35.8%) CaO (17.9%)
Point 19: SiO$_2$ (31.5%) Al$_2$O$_3$ (53.6%) CaO (14.9%)
Point 20: SiO$_2$ (25.2%) Al$_2$O$_3$ (57.5%) CaO (17.3%).

4. The kit according to claim 1 wherein the shaped article is selected from the group consisting of: a paper, a block, a board, a mat and a felt.

5. The adhered shaped article according to claim 2 wherein the shaped article is selected from the group consisting of: a paper, a block, a board, a mat and a felt.

6. The adhered shaped article according to claim 3 wherein the shaped article is selected from the group consisting of: a paper, a block, a board, a mat and a felt.

7. The adhered shaped article according to claim 2 wherein inorganic fibers in an adhered article are capable of being heated to at least 1100° C., without melting.

8. The adhered shaped article according to claim 3 wherein inorganic fibers in an adhered article are capable of being heated to at least 1100° C., without melting.

9. The adhered shaped article according to claim 7 wherein the inorganic fibers are bio-soluble fibers.

10. The adhered shaped article according to claim 8 wherein the inorganic fibers are bio-soluble fibers.

11. The kit according to claim 1 wherein at least some of the inorganic fibers are bio-soluble fibers.

12. A method comprising adhering a shaped article comprising bio-soluble inorganic fibers using an adhesive composition, the adhesive composition comprising:
colloidal silica,
an inorganic component, in addition to the colloidal silica, comprising at least one selected from the group consisting of SiO$_2$, CaO and Al$_2$O$_3$, and
no zeolite,
the total amounts of SiO$_2$, CaO and Al$_2$O$_3$ relative to each other in the adhesive composition being within the FIG. 1 SiO$_2$—Al$_2$O$_3$—CaO state diagram, but excluding range I defined by points A, 8, 18, 19 and 20 in the FIG. 1 SiO$_2$—Al$_2$O$_3$—CaO state diagram, wherein, by weight percent:
Point A: SiO$_2$ (O %) Al$_2$O$_3$ (100%) CaO (0%)
Point 8: SiO$_2$ (20.8%) Al$_2$O$_1$ (79.2%) CaO (0%)
Point 18: SiO$_2$ (46.3%) Al$_2$O$_3$ (35.8%) CaO (17.9%)
Point 19: SiO$_2$ (31.5%) Al$_2$O$_3$ (53.6%) CaO (14.9%)
Point 20: SiO$_2$ (25.2%) Al$_2$O$_3$ (57.5%) CaO (17.3%).

13. An adhesive composition for inorganic fibers consisting essentially of,
colloidal silica,
fused silica,
water,
an organic binder,
but no CaO, Al$_2$O$_3$, and zeolite,
the total amounts of SiO$_2$, CaO and Al$_2$O$_3$ relative to each other in the adhesive composition being within the FIG. 1 SiO$_2$—Al$_2$O$_3$—CaO state diagram, but excluding range I defined by points A, 8, 18, 19 and 20 in the FIG. 1 SiO$_2$—Al$_2$O$_3$—CaO state diagram, wherein, by weight percent:
Point A: SiO$_2$ (O %) Al$_2$O$_3$ (100%) CaO (0%)
Point 8: SiO$_2$ (20.8%) Al$_2$O$_3$ (79.2%) CaO (0%)
Point 18: SiO$_2$ (46.3%) Al$_2$O$_3$ (35.8%) CaO (17.9%)
Point 19: SiO$_2$ (31.5%) Al$_2$O$_1$ (53.6%) CaO (14.9%)
Point 20: SiO$_2$ (25.2%) Al$_2$O$_3$ (57.5%) CaO (17.3%).

14. An adhesive composition for inorganic fibers consisting essentially of,
colloidal silica,
fused silica,
water,
an organic binder,
an antiseptic,
but no CaO, Al$_2$O$_3$, and zeolite,
the total amounts of SiO$_2$, CaO and Al$_2$O$_3$ relative to each other in the adhesive composition being within the FIG. 1 SiO$_2$—Al$_2$O$_3$—CaO state diagram, but excluding range I defined by points A, 8, 18, 19 and 20 in the FIG. 1 SiO$_2$—Al$_2$O$_3$—CaO state diagram, wherein, by weight percent:
Point A: SiO$_2$ (O %) Al$_2$O$_3$ (100%) CaO (0%)
Point 8: SiO$_2$ (20.8%) Al$_2$O$_3$ (79.2%) CaO (0%)
Point 18: SiO$_2$ (46.3%) Al$_2$O$_3$ (35.8%) CaO (17.9%)
Point 19: SiO$_2$ (31.5%) Al$_2$O$_3$ (53.6%) CaO (14.9%)
Point 20: SiO$_2$ (25.2%) Al$_2$O$_3$ (57.5%) CaO (17.3%).

15. The adhesive composition for inorganic fibers according to claim 14 wherein the organic binder is a cellulose-based binder.

16. The adhered shaped article according to claim 3 wherein, the total amounts of SiO$_2$, CaO and Al$_2$O$_3$ relative to each other in the adhesive composition are within range II defined by points 1, 7, 28, 17, 14 and 13 in the FIG. 1 $SiO_2$—$Al_2O_3$—CaO state diagram, wherein, by weight percent:

| | | |
|---|---|---|
| Point 1: $SiO_2$ (100%) | $Al_2O_3$ (0%) | CaO (0%) |
| Point 7: $SiO_2$ (30.7%) | $Al_2O_3$ (69.3%) | CaO (0%) |
| Point 28: $SiO_2$ (51.7%) | $Al_2O_3$ (40.8%) | CaO (7.5%) |
| Point 17: $SiO_2$ (64.2%) | $Al_2O_3$ (21.5%) | CaO (14.3%) |
| Point 14: $SiO_2$ (64.2%) | $Al_2O_3$ (17.9%) | CaO (17.9%) |
| Point 13: $SiO_2$ (58.3%) | $Al_2O_3$ (0%) | CaO (41.7%). |

17. The adhered shaped article according to claim 3, further comprising an organic binder in an amount of about 0.5 wt % to about 10 wt % of the total adhesive.

18. The adhered shaped article according to claim 3 wherein the inorganic fibers comprise:
   total $SiO_2$, $Al_2O_3$, $ZrO_2$, and $TiO_2$: about 50 wt % to about 82 wt %, and
   total CaO and MgO: about 18 wt % to about 50 wt %.

19. The adhered shaped article according to claim 3 wherein the inorganic fibers comprising:
   $SiO_2$: about 50 wt % to about 82 wt %, and
   Total CaO and MgO: about 10 wt % to about 43 wt %.

20. The method according to claim 12 wherein, the total amounts of $SiO_2$, CaO and $Al_2O_3$ relative to each other in the adhesive composition are within range II defined by points 1, 7, 28, 17, 14 and 13 in the FIG. 1 $SiO_2$—$Al_2O_3$—CaO state diagram, wherein, by weight percent:

| | | |
|---|---|---|
| Point 1: $SiO_2$ (100%) | $Al_2O_3$ (0%) | CaO (0%) |
| Point 7: $SiO_2$ (30.7%) | $Al_2O_3$ (69.3%) | CaO (0%) |
| Point 28: $SiO_2$ (51.7%) | $Al_2O_3$ (40.8%) | CaO (7.5%) |
| Point 17: $SiO_2$ (64.2%) | $Al_2O_3$ (21.5%) | CaO (14.3%) |
| Point 14: $SiO_2$ (64.2%) | $Al_2O_3$ (17.9%) | CaO (17.9%) |
| Point 13: $SiO_2$ (58.3%) | $Al_2O_3$ (0%) | CaO (41.7%). |

21. The method according to claim 12, further comprising an organic binder in an amount of about 0.5 wt % to about 10 wt % of the total adhesive.

22. The method according to claim 12 wherein the inorganic fibers comprise:
   total $SiO_2$, $Al_2O_3$, $ZrO_2$, and $TiO_2$: about 50 wt % to about 82 wt %, and
   total CaO and MgO: about 18 wt % to about 50 wt %.

23. The adhesive method according to claim 12 wherein the inorganic fibers comprise:
   $SiO_2$: about 50 wt % to about 82 wt %, and
   Total CaO and MgO: about 10 wt % to about 43 wt %.

* * * * *